United States Patent [19]

Voss

[11] Patent Number: 4,863,751

[45] Date of Patent: Sep. 5, 1989

[54] READY TO USE LIQUID BAKERY WASH

[75] Inventor: Gordon D. Voss, Cincinnati, Ohio

[73] Assignee: Baker's Bright Inc., Cincinnati, Ohio

[21] Appl. No.: 140,046

[22] Filed: Dec. 31, 1987

[51] Int. Cl.⁴ .............................................. A23L 3/34
[52] U.S. Cl. .................................... 426/532; 426/293; 426/310; 426/588; 426/654
[58] Field of Search ............... 426/532, 293, 654, 310, 426/588

[56] References Cited

U.S. PATENT DOCUMENTS

| | | | |
|---|---|---|---|
| 3,655,404 | 4/1972 | Glasser et al. | 426/532 |
| 4,276,311 | 6/1981 | Burrows et al. | 426/532 |
| 4,446,164 | 5/1984 | Brog | 426/588 |
| 4,504,502 | 3/1985 | Earle et al. | 426/293 |
| 4,645,674 | 2/1987 | Lang | 426/549 |

OTHER PUBLICATIONS

Winter, Ruth, 1973, A Consumer's Dictionary of Food Additives, Crown Publishers, Inc., New York.

*Primary Examiner*—Donald E. Czaja
*Assistant Examiner*—Helen Pratt
*Attorney, Agent, or Firm*—Frost & Jacobs

[57] ABSTRACT

The present invention relates to a liquid, shelf-stable ready-to-use baker's wash for coating bakery products such as rolls, bread and pie crusts. The wash can be applied either before or after baking to provide a shine to the bakery product. The present invention also relates to a preservative composition which may be used in the inventive bakery wash or otherwise to control both fungal and bacterial growth. The preservative composition contains a mixture of methyl-and propyl-parabens, wherein the ratio of the percent by weight of the methylparaben to that of the propylparaben is at least 1.25 to 1.

21 Claims, No Drawings

READY TO USE LIQUID BAKERY WASH

BACKGROUND OF THE INVENTION

1. Field of the Invention

The present invention pertains to a liquid, shelf stable, ready to use baker's wash for coating bakery products such as rolls, bread and pie crusts. The wash can be applied either before or after baking to provide a shine to the bakery product.

2. Prior Art

Dry powder tyoe baker washes are conventionally known in the art. Early baker washes consisted primarily of dried egg white and other ingredients, for example, a dissolving agent to help the dried egg white dissolve in water. An exemplary prior art dried egg white baker washes is disclosed in U.S. Pat. No. 4,115,592 to Bertquist et al. The Bertquist et al patent discloses a process for preparing dried egg white having improved flow and water solubility characteristics. The process produces a powder comprised primarily of dried egg white and sugar. When it is desired to use the powdered composition on bakery goods, the powder is dissolved in water and applied by spraying, brushing, or the like.

Egg white washes, like that of Bertquist et al, were not shelf stable. Once the egg white powder was dissolved in the water, it had to be used within about 8 hours. After one day, the microorganism growth became prohibitively high such that the wash could not longer be employed on bakery goods. For this reason, it was necessary to make a fresh wash mixture every day. Since the liquid wash was a good medium for microorganism growth, manufacturers of egg white washes supplied bakeries with the product in a powder form which had a longer shelf life. However, contamination of the dry egg white powder often occurred since it is capable of supporting microorganism growth, especially in humid conditions, since the egg white powder is hydrophillic. Making wash with contaminated egg white powder would accelerate microorganism growth so that the wash is unusable, or at best, the application time of the wash was greatly reduced.

In response to obvious abuses by bakeries, health departments of various states have now outlawed washes which employ egg white. Southern states having warm moist climates, such as the State of Louisiana, are particularly concerned with microorganism growth on food products. Accordingly, the southern states were generally the first states to outlaw the use of washes having an egg white composition.

In response to health concerns, manufacturers started developing washes which would produce a shine on bakery products, like the egg white composition wash, but would not contain egg white. Primarily, these dry formulations employed a protein substitute for the egg white, such as whey, and included additional ingredients necessary to make the whey perform in a similar manner as egg white. While these various protein compositions function in a manner very similar to the egg white composition washes, they do not serve as a medium for microorganism growth in dry powder form. However, these non-egg white composition free washes will support microorganism growth when the wash is in a liquid form; thus, the wash must be used within one day. Consequently, manufacturers, like the assignee of the present invention, manufactured a non-egg white wash in powdered form which had a more stable shelf life. Nevertheless, bakeries must still add the powdered product to water to create the wash.

Another problem sometimes experienced with the non-egg white composition washes is the failure of the end user to properly mix the correct proportion of powder with the right amount of water. For example, in using the non-egg white composition manufactured by the assignee, Baker's Bright Incorporated, three different proportions of powder are employed based upon different applications. The before oven application for bread or rolls requires 3.25 oz. of the powder composition to be mixed with 1 quart of warm water (120°–130° F.). The after oven application for bread or rolls requires 1.6–2.5 oz. of the powder composition to be mixed with 1 quart of warm water. The before oven application for pies only requires 4.0 oz. of the powder composition to be mixed with 1 quart of warm water and 2 oz. of vegetable oil. As stated previously, these different preparations of powder sometimes confuse the baker, resulting in bakery products which are less appealing to the consumer.

Further, once the composition has been mixed with the warm water, it must set for about one-half hour in order to fully dissolve, attain a uniform viscosity, and become homogeneous. Failure to permit the wash to set for about 30 minutes may result in an undissolved product having a lumpy composition which cannot be sprayed and which gives an undesirable appearance even if brushed on the bakery product because very little or no shine is produced.

Because of the potential improper mixing by the end user and the lag time before use, a need exists for a wash which does not contain any egg white, is ready to use in a liquid form, and is shelf stable. By shelf stable, it is meant a wash capable of lasting at least 21 days after opening, with proper refrigeration. In effect, a shelf stable wash must meet the minimum microorganism standards required by the FDA, both before and after opening. Once the microorganism level exceeds the minimum FDA requirements, the wash is no longer said to be shelf stable.

One of the chief characteristics of the present invention is to make a wash in a ready-to-use form so that it may be immediately employed upon opening by spraying or brushing the wash on bakery products.

The present invention is also intended to provide a wash which is shelf stable even after opening, although refrigeration may be required. In this regard it is desirable to provide a wash which is resistant to both gram positive and gram negative bacteria as well as yeast and mold.

Another characteristic of the present invention is to provide a wash which contains no lumps, produces a uniform sheen on bakery products and can easily be sprayed or brushed onto the bakery products as is desired.

Another aim of the present invention is to provide a wash which will impart to bakery products a sheen and can be applied to the bakery products either before or after the product is baked in an oven, which contains no egg products, is shelf stable, and is ready to use with no further steps being necessary to prepare the wash other than perhaps shaking the wash to assure a uniform composition.

SUMMARY OF THE INVENTION

The above characteristics, aims and aspects are achieved with the wash of the present invention which contains no egg products, is shelf stable and will remain shelf stable after opening, with refrigeration, and is ready to use after agitating the contents of the wash. The wash can be applied either by spraying, brushing, dipping or by any other known application technique as desired.

The present invention comprises a ready-to-use, shelf stable aqueous wash for providing a shine on bakery products. The composition broadly contains about 4.9% to about 9% of at least one non-egg white protein; at least one anti-precipitive agent; at least one viscosity control stabilizer; and an inventive neutral pH effective preservative composition. The preservative composition in turn comprises a mixture of methyl- and propylparabens and a suitable dispersing agent such as a glycol.

DESCRIPTION OF THE PREFERRED EMBODIMENTS

A coating is described for providing a shine on bakery products such as breads, rolls, pie crusts, or the like, which is ready to use, contains no egg products, is shelf stable, and also acts as a moisture barrier. The ready-to-use coating composition generally comprises about 4.9 to 9% non-egg white protein, an inventive neutral pH effective preservative system, an antiprecipitive agent and a viscosity control stabilizer in an aqueous mixture.

The non-egg white protein source of the present invention may contain from about 60% to about 95% protein and may include ingredients of varying protein content such as sodium, calcium or sodium/calcium caseinates, soy proteins, whey proteins, yeast proteins and mixtures thereof.

Preferably, the non-egg white protein source is granular or powdered sodium and/or calcium caseinate which usually has a protein content of about 80–92% or whey protein concentrate usually having a protein content of about 60%. The proportion of protein in the protein source(s) is not critical. However, the final ready-to-use baker's shine composition should have at least 4.9% protein in order to produce acceptable shine characteristics. The amount of the selected protein source(s) can be adjusted to assure at least such a protein level.

Because caseinates are the preferred protein source because they are high in protein content, it is contemplated that their use as an egg white substitute protein source will occur most frequently in conducting the present invention. However, if the caseinate(s) attains a pH below 5.5, it will curdle, resembling cottage cheese. To prevent this, a pH buffer, or "antiprecipative agent", is employed, as mentioned later, to maintain the pH at about the neutral point. This not only prevents any caseinates from curdling, but also makes the protein from any protein source more soluble and prevents aggregation and coagulation of the denatured proteins.

The anti-precipative agents which may be used in the present invention may be selected from any of those suitable to the desired baker's shine product produced in accordance with the present invention. The preferred anti-precipative agents are those selected from the group consisting of phosphates or polyphosphates, preferably sodium hexametaphosphate which may be used at a level within the range of from about 0.04% to about 0.12% by weight. Although some phosphates may be used as an anti-precipative agent, disodium phosphates and phosphates or polyphosphates containing calcium should be avoided as they tend to create precipitation problems.

The viscosity control stabilizers which may be used in accordance with the present invention may be selected from any of those stabilizers particularly suited to a given embodiment of the invention. These may include carrageenan, tragacanth gum, xanthan gum, arabic gum, guar gum, carboxymethylcellulose or gelatin. The preferred viscosity control stabilizer is calcium carrageenan such as Viscarin SD 389, obtainable from Marine Colloids Division of FMC Corporation. The amount of viscosity control stabilizer used in the present invention will vary with the desired thickness of the resulting baker's shine composition but should generally be present at a level sufficient to maintain the baker's shine composition on the bakery product. The determination of such a suitable level is within the knowledge of one skilled in the art.

The preservative system of the invention comprises generally a mixture of methyl- and propylparaben and at least one glycol or other suitable dispersing agent. Preferably, proplyene glycol is employed as the dispersing agent, because it also aids in inhibiting both fermentation and mold growth. Other glycols, polysorbates, or the like could be employed as the dispersing agent. The combination of the parabens in the present invention is preferred because it is has been found that neither paraben by itself is totally satisfactory in preventing microorganism growth. Parabens are effective against yeast and mold growth at about a neutral pH, but are of limited effectiveness against gram negative bacteria. Together, the two parabens also control gram negative bacteria up to a level of about $10^4$/cc. The preservative system aids in preventing microorganism growth and further extends the useful life of the ready-to-use, shelf stable liquid wash so long as the product is refrigerated after exposure to non-sterile conditions during use. Refrigeration of the baker's shine composition in the range of 40° to 50° F. will greatly aid in preventing bacterial growth.

The preservative system of the present invention contains methylparaben and propylparaben in amounts such that the relative ratios of the two parabens are, respectively, in the range of from about 1.25:1 to about 4:1 (methylparaben:propylparaben). The amount of methylparaben in the baker's shine composition is preferably within the range of about 0.1% by weight to about 0.4% by weight (based upon the total weight of the baker's shine composition). The amount of propylparaben may be selected so as to fall within the above amount ratio ranges. The preferable ratio of methylparaben to propylparaben is about 4:1.

A dispersing agent is necessary because both parabens are only slightly soluble in water, but are very soluble in glycols, such as propylene glycol, and in polysorbates. The glycols and polysorbates, on the other hand, are very soluble in water. Thus, each component in the neutral pH preservative system performs a necessary task. The dispersing agent used in the present invention need only be present in an amount sufficient to properly effect mixing of the parabens and allowing corporation of the mixture into a food product. an example of which is the dislcosed baker's shine composition. The preferred preservative composition (i.e., dispersing agent, methylparaben and propylparaben) contains about 80% propylene glycol, 16% methylparaben and 4% propylparaben and is preferably present in the baker's shine composition at a level of at least 1.8%, and preferably 2.5% by weight.

The baker's shine composition may optionally include one or more coloring agents, pH buffers or antioxidants which are well-known in the art and are commercially available.

The optional coloring agents may be selected from the group consisting of caramel, turmeric or, more preferably, carotene, or other artificial or natural yellow "egg" coloring agents. The optional antioxidants may be, for example, BHA, BHT, TBHQ, propyl gallate with citric acid, or the like, for example. Suitable pH buffers may be selected from any of those known in the art which are suitable for the desired application of the inventive shine composition.

Depending upon the use of the baker's shine composition, suitable vegetable oils such as, for example, soy bean oil may be incorporated in the baker's shine composition to improve the shine characteristics of the shine composition and maintain moisture within the bakery product. An example of such a use is the use of the inventive baker's shine composition on pie crust.

The water used in the present invention may be ordinary tap water having a pH of from about 6 to about 7. Nevertheless, any type of pure treated water can be employed so long as it meets federal clean water standards.

A preferred formulation for the baker's shine composition is:

| Ingredients | % By Weight | Lbs. |
| --- | --- | --- |
| Water | 90.008 | (1400 gallons) |
| Sodium Caseinate, Granular | 7.333 | 950 |
| Preservative System | 2.5 | 325 |
| Proplyene Glycol | 2.0 | |
| Methylparaben | 0.4 | |
| Propylparaben | 0.1 | |
| Sodium Hexametaphosphate | 0.0773 | 10 |
| Carrageenan (Viscarin SD 389) | 0.059 | 7.65 |
| Beta Carotene | 0.0227 | 3 |
| TOTAL | 100.000% | 12,955 lbs. 1,520 gal. |

All percentages in the above description and in the claims are intended to mean percent by weight.

An example of a blending procedure for the ready to use, shelf stable liquid wash using the above formulation comprises: (1) add the pre-dissolved solution of propylene glycol, methylparaben and propylparaben slowly into warm water (130° F. or above) in blending equipment and mix two minutes until the preservative system is uniformly dispersed; (2) add the protein source, sodium hexametaphosphate and other ingredients, and mix until the uniform composition results; (3) maintain the temperature at about 130° F. or above (4) process the final liquid composition with the High Temperature Short Time Pasteurization equipment for three minutes at 198°-200° F. and homogenized at 1500 to 2500 psi. Cool the product to ambient temperature (about 55°-60° F.) and package using sanitary procedures known in the art for preventing contamination.

For best results, it is preferred that the preservative composition be added slowly to the warm water. If the composition is added quickly, the preservatives do not uniformly mix and disperse throughout the water. It is also preferred that the water be warm (at least about 130° F.), thus the solubility of the preservatives system is increased as compared to the ambient water temperature. Additionally, the warm water aids in more quickly dissolving the protein source than with ambient water.

Thus, it is apparent that there has been provided, in accordance with the invention, a composition that fully satisfies the aims, aspects, characteristics and advantages set forth above. While the invention has been described in conjunction with specific embodiments thereof, it is evident that many alternatives, modifications and variations will be apparent to those skilled in the art in light of the foregoing description which will facilitate the use of the present invention without departing from its spirit. Accordingly, it is intended to cover all such alternatives, modifications and variations as fall within the scope of the present invention.

What is claimed is:

1. A ready-to-use, shelf stable bakers' shine composition, comprising:
    (a) at least about 4.9% by weight of at least one non-egg white protein;
    (b) an effective amount of at least one anti-precipitive agent to prevent precipitation of said at least one non-egg white protein;
    (c) an effective amount of at least one viscosity control stabilizer; and
    (d) a preservative composition comprising methylparaben and propylparaben in amounts such that the ratio of the percent by weight of said methylparaben to that of said propylparaben is greater than 1.25:1 and an effective amount of at least one dispersing agent sufficient to effect incorporation of said methylparaben and said propylparaben into said baker's shine composition; and
    (e) water.

2. The composition according to claim 1 wherein the amount of said protein is in the range of from about 6.2 to 6.6 percent by weight.

3. The composition according to claim 1 wherein the amount of said protein source is about 6.2 percent by weight.

4. The composition according to claim 1 wherein said protein is provided by at least one compound selected from a group consisting of sodium calcium caseinates, sodium caseinates, calcium caseinates, whey proteins, yeast proteins and soya protein concentrates and isolates, and mixtures thereof.

5. The composition according to claim 1 wherein said protein is provided in the form of sodium caseinate.

6. The composition according to claim 1 wherein said anti-precipitive agent is selected from the group consisting of polyphosphates.

7. The composition according to claim 1 wherein said anti-precipitive agent is sodium hexametaphosphate.

8. The composition according to claim 7 wherein the amount of said sodium hexametaphosphate is in the range of from about 0.04 to about 0.12 percent by weight of said baker's shine composition.

9. The composition according to claim 1 wherein said viscosity control stabilizer is selected from the group consisting of carrageenan, tracaganth gum, xanthan gum, arabic gum, guar gum, carboxymethylcellulose and gelatin.

10. The composition according to claim 1 wherein said viscosity control stabilizer is calcium carrageenan.

11. The composition according to claim 10 wherein the amount of said viscosity control stabilizer is at least 0.05 percent by weight of said baker's shine composition.

12. The composition according to claim 1 wherein said preservative composition comprises about 80 percent by weight propylene glycol, about 16 percent by weight methylparaben, and about 4 percent by weight propylparaben.

13. The composition according to claim 1 wherein said composition contains at least 0.2 percent propylparaben and at least 0.25 percent methylparaben.

14. The composition according to claim 1 wherein said baker's shine composition additionally comprises vegetable oil.

15. A preservative composition effective in controlling mold, yeast and bacteria in foods, comprising: methylparaben and propylparaben; wherein the ratio of the percent by weight of said methylparaben to that of said propylparaben is at least 1.25:1; and an effective amount of at least one dispersing agent to effect mixing of said parabens with a food product.

16. The preservative composition according to claim 15 wherein said ratio of the percent by weight of said methylparaben to that of said propylparaben is about 4:1.

17. The presevative composition according to claim 15 wherein said preservative composition contains about 80 percent by weight propylene glycol, about 16 percent by weight methylparaben, and about 4 percent by weight propylparaben.

18. A ready-to-use, shelf stable baker's shine composition, comprising:

(a) an amount of at least one caseinate sufficient to provide a protein content of at least 4.9% by weight protein in said baker's shine composition;

(b) an effective amount of sodium hexametaphosphate to prevent precipation of said at least one;

(c) an effective amount of a carrageenan to render said baker's shine composition sufficiently viscose to prevent the runoff of said baker's shine composition from a bakery product;

(d) an amount of preservative composition comprising propylene glycol, methylparaben and propylparaben wherein the ratio of the percent by weight of said methylparaben to that of said propylparaben is about 4:1 and wherein the amount of said proplylene glycol is sufficient to effect the incorporation of said methylparaben and propylparaben into said baker's shine composition; and (e) water.

19. The composition according to claim 18 wherein said methylparaben is present in an amount equal to about 0.4% of said baker's shine composition and wherein said propylparaben is present in an amount equal to about 0.1% of said baker's shine composition.

20. A preservative composition effective in controlling mold, yeast and bacteria in foods comprising: 80 percent propylene glycol, 16 percent methylparaben and 4 percent propylparaben.

21. The composition according to claim 1 wherein said amount of preservative composition is no less than 2.0% by weight of said baker's shine composition.

* * * * *